US012612295B1

(12) United States Patent
Yi

(10) Patent No.: US 12,612,295 B1
(45) Date of Patent: Apr. 28, 2026

(54) MULTI-PURPOSE VACUUM MACHINE

(71) Applicant: Nuoyan Yi, Yuanjiang (CN)

(72) Inventor: Nuoyan Yi, Yuanjiang (CN)

( * ) Notice: Subject to any disclaimer, the term of this patent is extended or adjusted under 35 U.S.C. 154(b) by 9 days.

(21) Appl. No.: 19/245,177

(22) Filed: Jun. 20, 2025

(30) Foreign Application Priority Data

May 26, 2025 (CN) ......................... 202521051831.1

(51) Int. Cl.
*B67B 3/24* (2006.01)

(52) U.S. Cl.
CPC ..................................... *B67B 3/24* (2013.01)

(58) Field of Classification Search
CPC ........................................................ B67B 3/24
USPC ............................................................ 141/65
See application file for complete search history.

(56) References Cited

U.S. PATENT DOCUMENTS 2,729,381 A * 1/1956 Jacques .................. B65D 51/16 141/4
2,754,082 A * 7/1956 Crandall ................... B65B 3/28 177/78
10,932,622 B2 3/2021 Haskins
11,130,613 B2 9/2021 Sangiacomo
11,472,611 B1 10/2022 Hove
11,678,770 B2 6/2023 Sangiacomo
11,701,916 B2 7/2023 Zambrotta
11,858,702 B2 1/2024 Bacher et al.
2007/0186992 A1* 8/2007 Bullen .................... B65B 3/003 141/65
2017/0144877 A1* 5/2017 Rider ................... B67D 1/0801
2018/0345271 A1* 12/2018 Kozlenko ............. B01L 3/0213

* cited by examiner

*Primary Examiner* — Christopher M Afful
(74) *Attorney, Agent, or Firm* — Nitin Kaushik

(57) ABSTRACT

A multi-purpose vacuum machine includes a body. The body of the multi-purpose vacuum machine includes at least two end faces, and each of the at least two end faces define a vacuum chamber. The vacuum chamber includes a chamber base and a sealing ring, and the chamber base defines an at least one air suction hole. The multi-way valve includes a first port and at least one second port. The vacuum pump is connected to the first port, and the at least one air suction hole is in communication with a corresponding second port. The main control board is electrically connected to the vacuum pump and the multi-way valve. The vacuum chamber is configured to receiving the bottle mouth of a container.

12 Claims, 14 Drawing Sheets

MULTI-PURPOSE VACUUM MACHINE

CROSS-REFERENCE TO RELATED APPLICATIONS

This application claims priority benefits to Chinese Patent Application No. 202521058311, filed on May 26, 2025, the contents of which are incorporated herein by reference.

TECHNICAL FIELD

The present disclosure relates to the technical field of vacuum machines, in particular a multi-purpose vacuum machine applicable in Mason jars and vacuum storage bags.

BACKGROUND

Mason jars are widely used containers for storing food, characterized by their wide mouth, which facilitates easy handling and use. To extend the shelf life of the stored food, it is typically necessary to remove the air inside the Mason jar, creating a vacuum environment.

SUMMARY

The present disclosure provides a multi-purpose vacuum machine, including: a body including at least two end faces, each of the at least two end faces defining a vacuum chamber; the vacuum chamber including a chamber base and a sealing ring, and the chamber base defining at least one air suction hole; an air extraction assembly including a vacuum pump and a multi-way valve, the multi-way valve including a first port and at least one second port, a number of the at least one second port is equal to a number of the at least one air suction hole, and the first port being selectively in communication with one of the at least one second port to form different connection states; the first port being in communication with the vacuum pump, and each of the at least one second port being in communication with a corresponding one of the at least one air suction hole; a direction sensing switch configured to obtain a directional change of the body; and a main control board; the vacuum pump, the multi-way valve and the direction sensing switch being electrically connected to the main control board, and the main control board configured to control the connection state of the multi-way valve based on a direction obtained by the direction sensing switch. The vacuum chamber is configured to accommodate a bottle mouth of a container and seal the bottle mouth, and the at least two of the vacuum chambers comprises at least two different accommodation sizes to adapt to bottle mouths of different sizes.

BRIEF DESCRIPTION OF DRAWINGS

The drawings that form part of the present disclosure are provided to further illustrate the present disclosure. The illustrative embodiments and their descriptions of the present disclosure are intended to explain but do not constitute an undue limitation on the present disclosure.

DETAILED DESCRIPTION OF THE EMBODIMENTS

Figure 1:
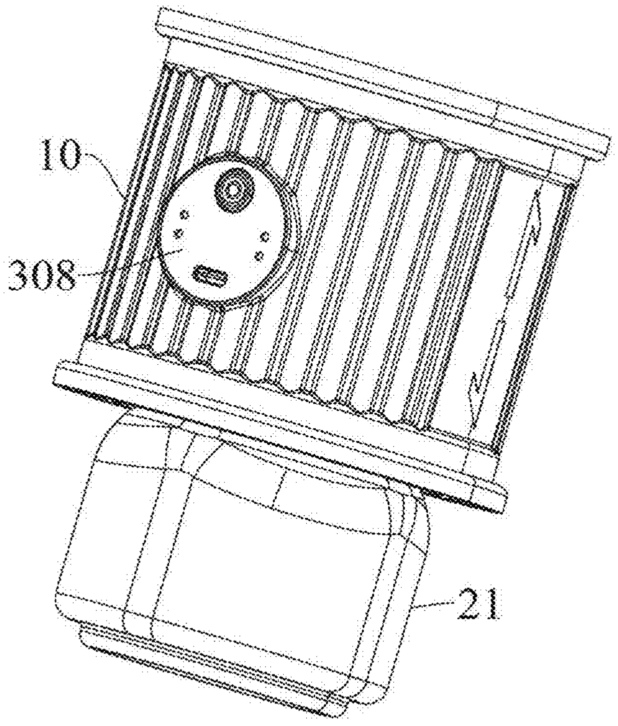
FIG. 1 is a perspective view of a vacuum machine assembled with the Mason jar according to some embodiments of the present disclosure.

The following will be combined with the drawings in the embodiments of the present disclosure to clearly and completely describe the technical solutions in the embodiments of the present disclosure. Obviously, the described embodiments are only part but not all of the embodiments. Based on the embodiments in the present disclosure, all other embodiments obtained by those skilled in the art without creative work belong to the protection scope of the present disclosure.

It should be noted that all directional indications in the embodiments of the present disclosure (such as up, down, left, right, front, back, etc.) are only configured to explain the relative position relationship, movement, etc. between the components under a certain posture (as illustrated in the drawings). If the specific posture changes, the directional indication will also change accordingly.

In the present disclosure, unless otherwise clearly specified and limited, the terms "connection", "fixation", etc. should be understood in a broad sense. For example, "fixation" may be a fixed connection, a detachable connection, or an integral connection; it may be a mechanical connection or an electrical connection; it may be directly connected or indirectly connected through an intermediate medium, it may be the internal connection of two elements or the interaction relationship between two elements, unless otherwise clearly defined. For those skilled in the art, the specific meanings of the above terms in the present disclosure may be understood according to the specific circumstances.

In addition, if there are descriptions involving "first", "second", etc. in the embodiments of the present disclosure, the descriptions of "first", "second", etc. are only for descriptive purposes and cannot be understood as indicating or implying their relative importance or implicitly indicating the number of technical features indicated. Therefore, the features defined as "first" and "second" may explicitly or implicitly include at least one of the features. In addition, the meaning of "and/or" appearing in the full text includes three parallel schemes. Taking "A and/or B" as an example, it includes scheme A, scheme B, or schemes that satisfy both A and B. In addition, the technical schemes between the various embodiments may be combined with each other, but they must be based on the ability of those skilled in the art to implement them. When the combination of technical schemes is contradictory or cannot be implemented, it should be considered that such a combination of technical schemes does not exist and is not within the protection scope required by the present disclosure.

Figure 2:
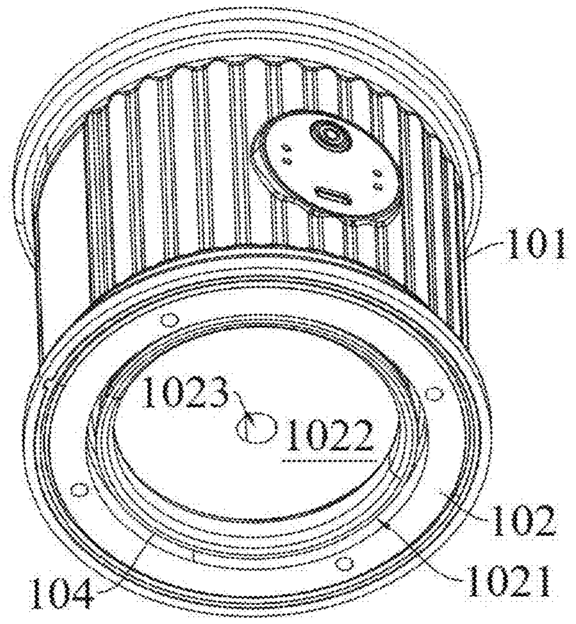
FIG. 2 is a perspective view of the overall a vacuum machine according to some embodiments of the present disclosure.
Figure 3:
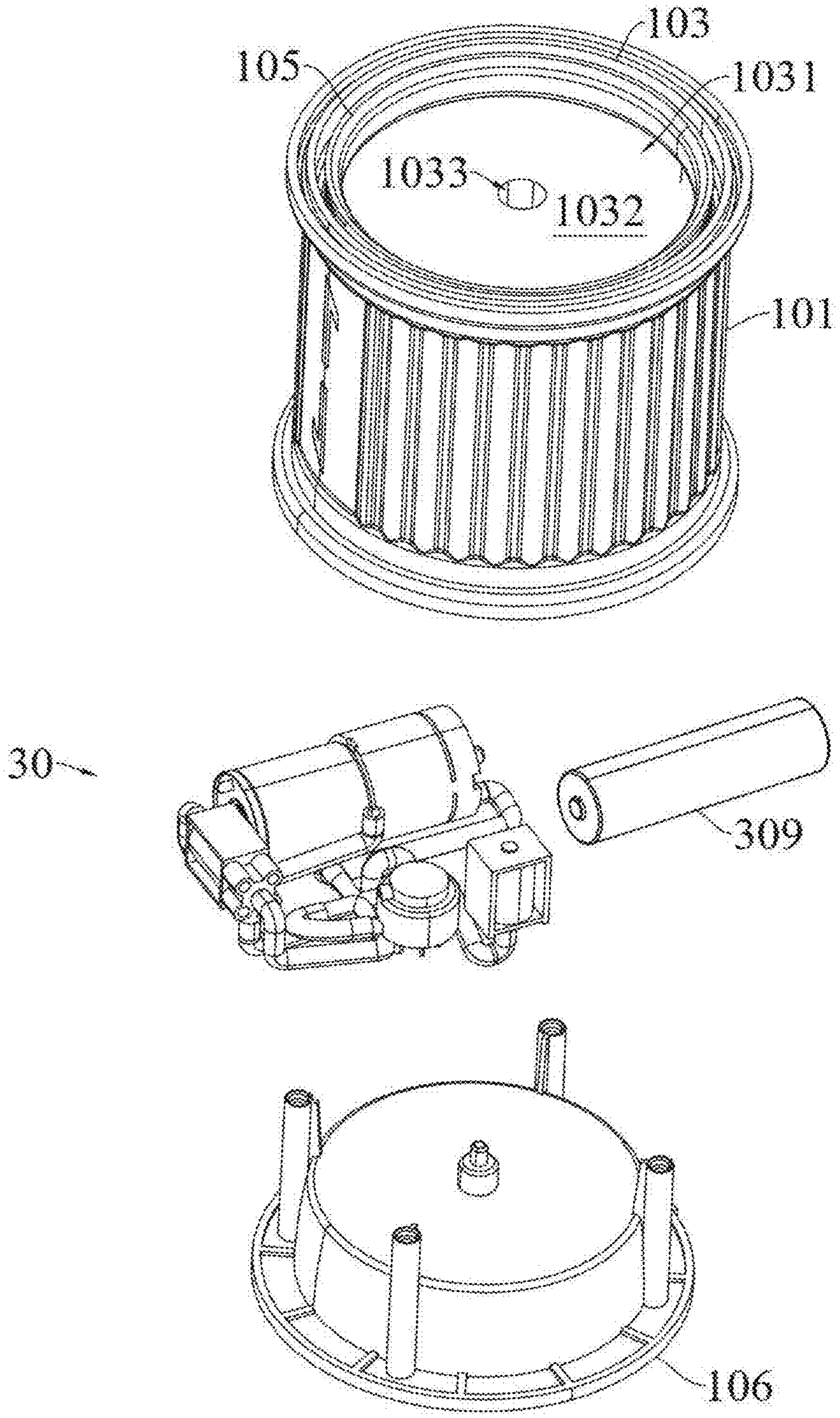
FIG. 3 is an exploded perspective view of a vacuum machine according to some embodiments of the present disclosure.
Figure 4:
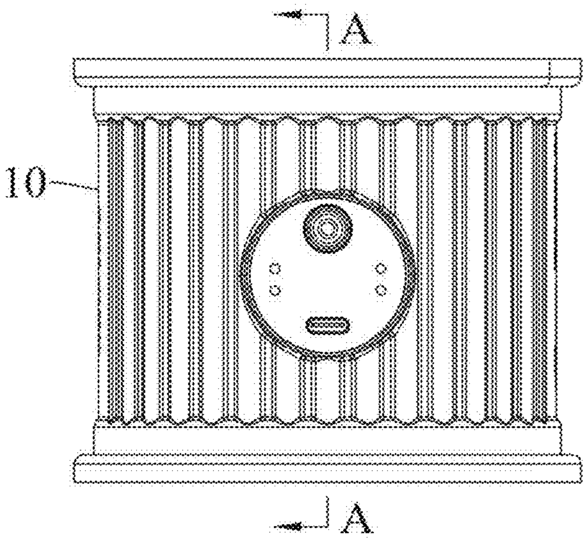
FIG. 4 is a side view of FIG. 2.

As illustrated in FIG. 1 to FIG. 3, according some embodiments of the present disclosure, a vacuum machine 10 is provided, which is applied to a Mason jar 21. The vacuum machine 10 includes a body 101, and the body 101 includes two end faces, namely a first end face 102 and a second end face 103. According to some embodiments of the present disclosure, the first end face 102 and the second end face 103 are arranged in opposite directions of the body 101. In some embodiments, the first end face 102 and the second end face 103 may be selectively arranged in other directions, and there is no specific limitation here.

The first end face 102 defines a first vacuum chamber 1021 that is concave inward. The first vacuum chamber 1021 includes a first chamber base 1022 and a first sealing ring 104. The first chamber base 1022 is defined with a first suction hole 1023. The second end face 103 is defined with a second vacuum chamber 1031 that is concave inward. The second vacuum chamber 1031 includes a second chamber base 1032 and a second sealing ring 105. The second chamber base 1032 is defined with a second suction hole 1033.

Figure 5:
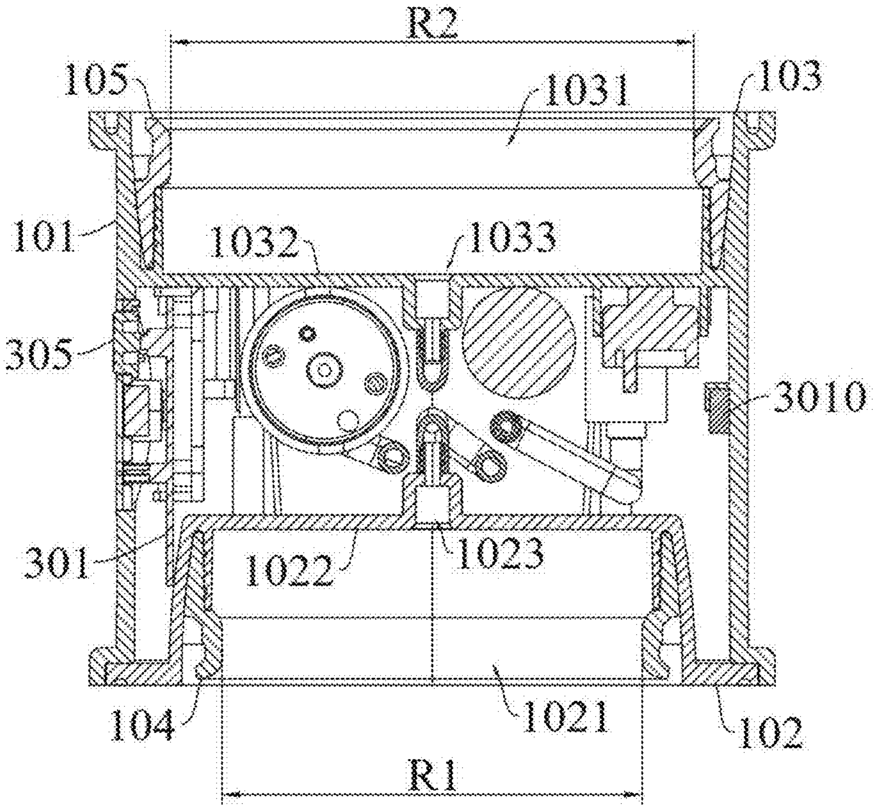
FIG. 5 is a cross-sectional view taken along line AA of FIG. 4.

The difference between the first vacuum chamber 1021 and the second vacuum chamber 1031 is that the two vacuum chambers may accommodate different specifications of bottle mouths 211 of a Mason jar 21. The first vacuum chamber 1021 is configured to accommodate a standard bottle mouth of a Mason jar 21, and the second vacuum chamber 1031 is configured to accommodate a non-standard bottle mouth of a Mason jar 21. In some embodiments as illustrated in FIG. 5, an opening radius R2 of the second vacuum chamber 1031 is greater than an opening radius R1 of the first vacuum chamber 1021. The first vacuum chamber 1021 having the opening radius R1 may accommodate a standard bottle mouth, and the second vacuum chamber 1031 having the opening radius R2 may accommodate a non-standard bottle mouth. In some embodiments, the standard bottle mouth may be selected as 70 mm which is commonly used in the industry, and the non-standard bottle mouth may be selected as 86 mm which is commonly used in the industry. Other sizes may also be selected, and there is no specific restriction here. In some embodiments, the first vacuum chamber 1021 having the opening radius R1 may accommodate a non-standard bottle mouth, and the second vacuum chamber 1031 having the opening radius R2 may accommodate a standard bottle mouth. Such a setting is also not limited.

The body 101 is provided with an exhaust assembly 30, and the exhaust assembly 30 is provided with a first pipe 3051 and a second pipe 3052. A first end of the first pipe 3051 is in communication with an end of the first suction hole 1023 facing away from the first vacuum chamber 1021. A first end of the second pipe 3052 is in communication with an end of the second suction hole 1033 facing away from the second vacuum chamber 1031. The second end of the first pipe 3051 and the second end of the second pipe 3052 are both connected to different air inlets of a three-way valve 307. An air outlet of the three-way valve 307 is in communication with a vacuum pump 302. The three-way valve 307 is an electrically controlled valve. The three-way valve 307 and the vacuum pump 302 are both electrically connected to a main control board 301. The main control board 301 may selectively control a communication state of the three-way valve 307 to enable the vacuum pump 302 to communicate with the first suction hole 1023 or the second suction hole 1033.

In some embodiments, the main control board 301 is provided with a control switch. The main control board 301 controls the communication state of the three-way valve 307 and the working state of the vacuum pump 302 according to different states of the control switch. In some embodiments, the main control board 301 may receive the number of touches of the control switch; for example, the vacuum pump 302 is started when the control switch is touched for the first time, and the three-way valve 307 communicates the first suction hole 1023 with the vacuum pump 302; the control switch is touched for the second time, and the main control board 301 controls the three-way valve 307 to communicate the second suction hole 1033 with the vacuum pump 302; the control switch is touched for the third time, and the vacuum pump 302 stops.

As illustrated in FIG. 5, in some embodiments, the main control board 301 is electrically connected to a direction sensing switch 3010, and the direction sensing switch 3010 is installed on the body 101. The direction sensing switch 3010 may obtain a directional change of the vacuum machine 10, and the main control board 301 may control the communication state of the three-way valve 307 according to the directional change of the vacuum machine 10. As illustrated in FIG. 5, assuming that the vacuum machine 10 in the FIG. is in the first direction state, the main control board 301 controls the three-way valve 307 to communicate the first suction hole 1023 with the vacuum pump 302. In this state, the Mason jar 21 may be placed in the first vacuum chamber 1021, and then be vacuumed after the vacuum pump 302 is started. If the vacuum machine 10 in FIG. 5 is turned upside down, the vacuum machine 10 is in the second direction state, and the main control board 301 controls the three-way valve 307 to communicate the second suction hole 1033 with the vacuum pump 302. The Mason jar 21 is placed in the second vacuum chamber 1031, and the Mason jar 21 is vacuumed as described above, which will not be repeated here.

Figure 7:
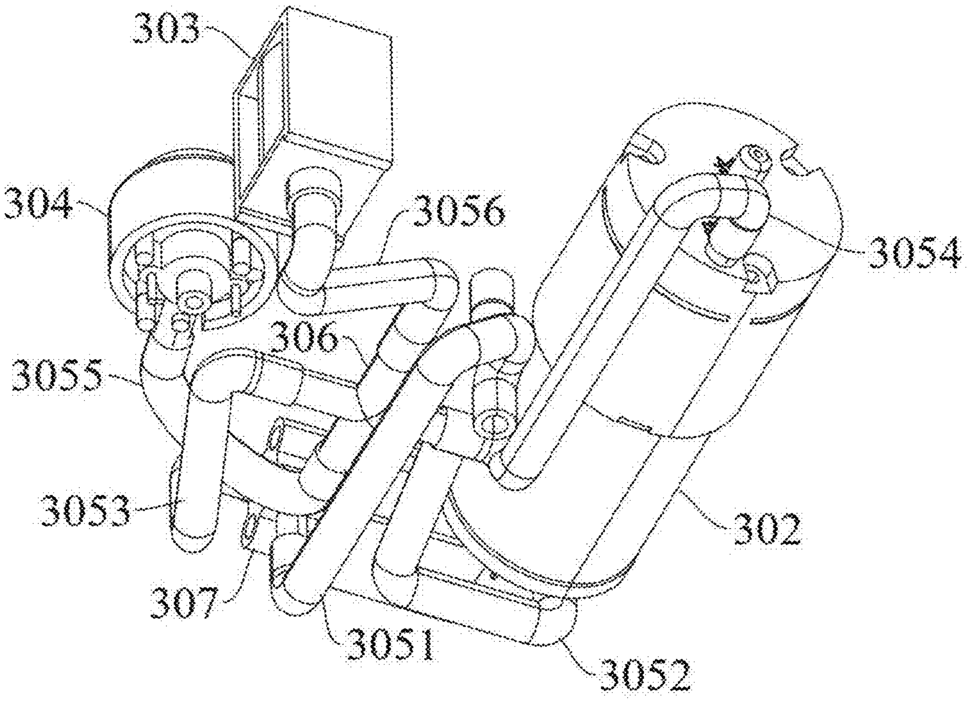
FIG. 7 is a perspective view of an air extraction assembly according to some embodiments of the present disclosure.
Figure 8:
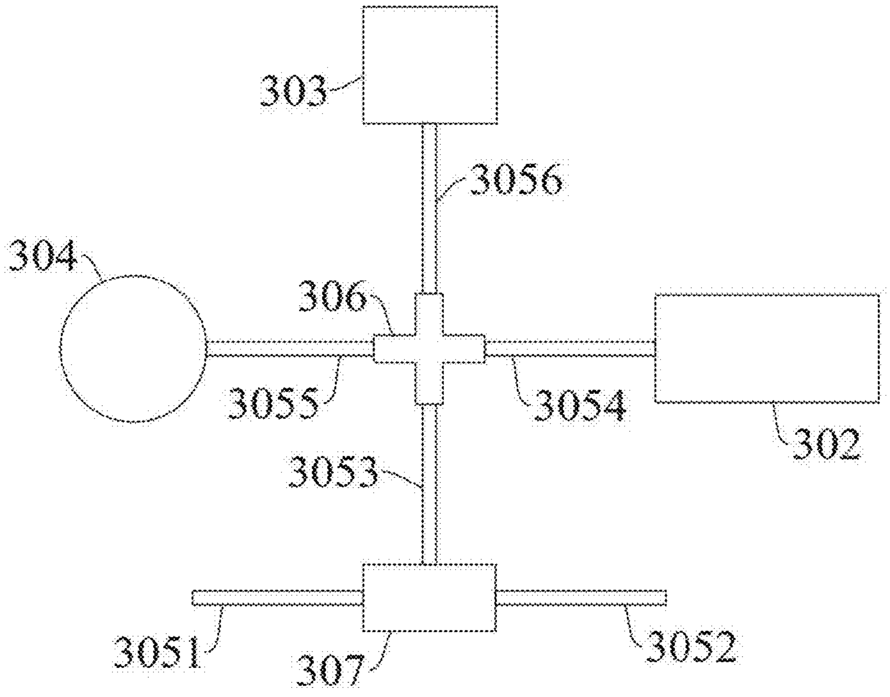
FIG. 8 is a plan view of an air extraction assembly illustrated in FIG. 7.

The above-mentioned vacuum extraction time may be preset in the main control board 301, or it may be controlled by the user. However, the duration required to achieve a vacuum of the Mason jar 21 varies, depending on its filling contents and filling level. It is difficult to ensure the quality of operation only by preset duration or user control. As illustrated in FIG. 3, FIG. 7 and FIG. 8, in some embodiments, a three-way piece is connected between the three-way valve 307 and the vacuum pump 302. Alternatively, the three-way piece and the three-way valve 307 are in communication with each other via a third pipe 3053, and the three-way piece and the vacuum pump 302 are in communication with each other via a fourth pipe 3054. Another port of the three-way piece is connected to the vacuum sensing switch 304 via a fifth pipe 3055. The vacuum sensing switch 304 is electrically connected to the main control board 301. When the vacuum pump 302 is started, the main control board 301 may obtain a current negative pressure value of the Mason jar 21 in real time through the vacuum sensing switch 304. The vacuum pump 302 is turned off after the negative pressure value reaches a threshold, and the vacuum extraction is completed. This approach enables the vacuum machine 10 to control vacuum extraction time based on the actual conditions of the Mason jar 21, improving operational quality.

After the vacuum extraction is completed, the vacuum chamber is still in a vacuum state, making it difficult for the Mason jar 21 to escape from the vacuum chamber. In some embodiments, the vacuum pump 302 may select a two-way pump, that is, the two-way pump may both pump air and inflate air. When the vacuum extraction is completed, the vacuum pump 302 may inject air into the vacuum chamber to release the vacuum state of the vacuum chamber. In some embodiments, the three-way piece is replaced with a four-way piece 306, and the four-way piece 306 is connected to a one-way air valve 303 which is in a normally closed state through via a sixth pipe 3056. The one-way air valve 303 is electrically connected to the main control board 301. Once the vacuum extraction is complete, the one-way air valve 303 opens, and the vacuum chamber may communicate with the outside through the one-way air valve 303 to balance the internal and external air pressures of the vacuum chamber, releasing the vacuum state of the vacuum chamber.

Figure 9:
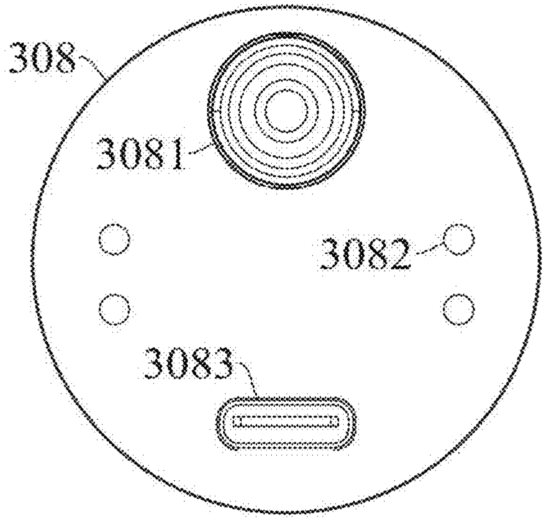
FIG. 9 is a perspective view of a panel according to some embodiments of the present disclosure.

As illustrated in FIG. 1 and FIG. 9, in some embodiments, a panel 308 is provided on the body 101, and a switch key is provided on the panel 308. The switch key is electrically connected to the main control board 301, and the working state of the vacuum machine 10 is controlled by the switch key. The above working state includes, but is not limited to, controlling the communication state of the three-way valve 307 and the start and stop of the vacuum pump 302; controlling the start and stop of the vacuum pump 302; and controlling the suction/blowing mode of the vacuum pump 302.

In some embodiments, at least one indicator light 3082 is also provided on the panel 308, and the at least one indicator light 3082 is electrically connected to the main control board 301. The at least one indicator light 3082 is configured to display the operating state of the vacuum machine 10. The operating state includes, but is not limited to, at least one of the state of the vacuum pump 302, the state of the one-way gas valve 303, the state of the vacuum sensing switch 304, and the state of the three-way valve 307.

In some embodiments, a power interface 3083 is also provided on the panel 308, and the power interface 3083 is electrically connected to the main control board 301. The power interface 3083 is configured to connect an external power adapter. The vacuum machine 10 of the present disclosure may be powered by an external power supply, or a built-in battery 309. The battery 309 may be selected to have a charging function. The main control board 301 is provided with a power management circuit, and the power management circuit includes a charging circuit. When the vacuum machine 10 is connected to the power adapter, the rechargeable battery 309 may be charged.

Figure 10:
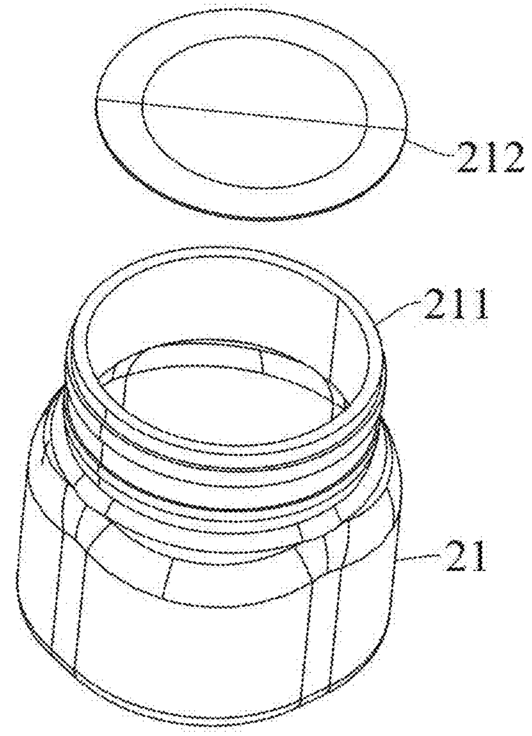
FIG. 10 is a perspective view of a Mason jar.
Figure 11:
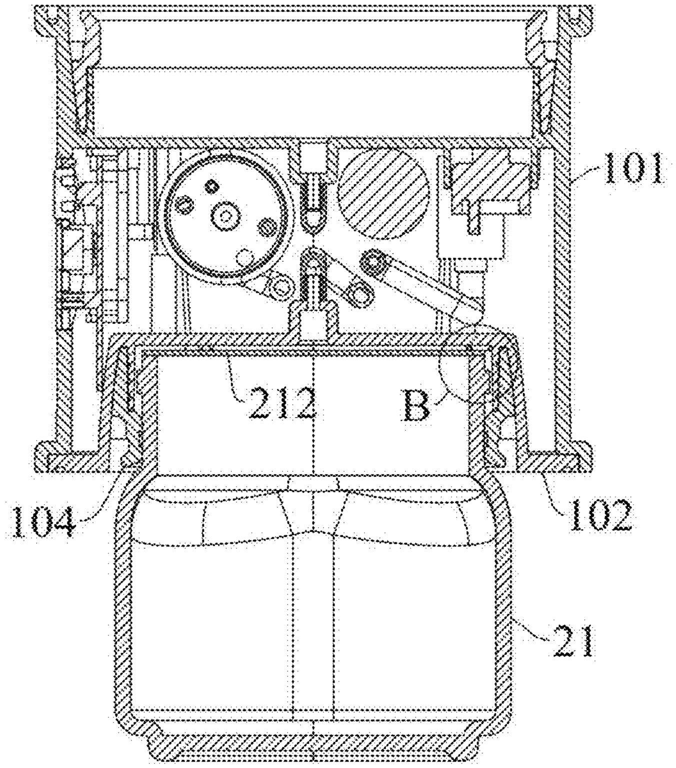
FIG. 11 is a cross-sectional view of a vacuum machine assembled with a Mason jar according to some embodiments of the present disclosure.
Figure 12:
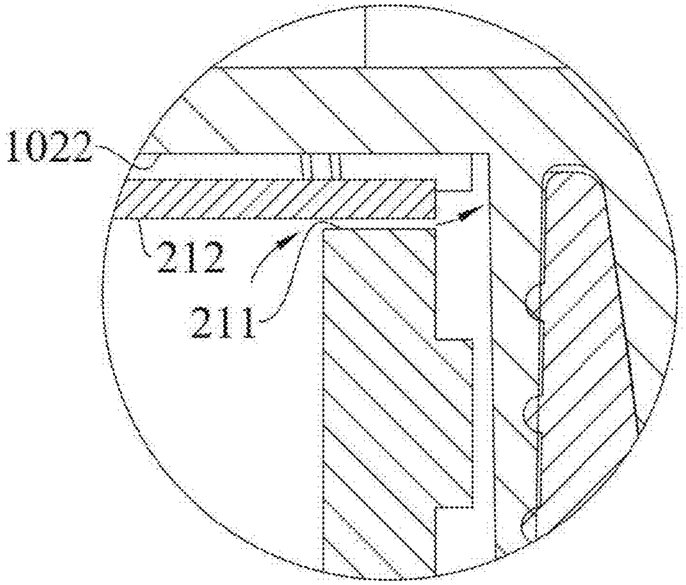
FIG. 12 is a partial enlarged perspective view of area B in FIG. 11, which shows an air flow direction in a Mason jar.

As illustrated in FIG. 10 to FIG. 12, FIG. 10 shows a Mason jar 21 with a lid 212 on top. FIG. 11 shows that the lid 212 is placed at the bottle mouth 211 of the Mason jar 21, and then the vacuum machine 10 is placed on the top of the Mason jar 21, allowing the bottle mouth 211 and the lid 212 of the Mason jar 21 to be accommodated in the first vacuum chamber 1021. A radius of the inlet 1042 of the first sealing ring 104 is smaller than a radius of the bottle mouth 211. The first sealing ring 104 is made of soft material, which makes it have a certain elasticity. Therefore, the bottle mouth 211 may still be inserted into the first vacuum chamber 1021 although the bottle mouth 211 and the inlet 1042 of the first sealing ring 104 are in interference fit. In this manner, a sidewall of the bottle mouth 211 is tightly wrapped by the first sealing ring 104, allowing the bottle mouth 211 and the lid 212 to be in a relatively closed space. As illustrated in FIG. 12, there is a gap between the lid 212 and the bottle mouth 211. When the vacuum machine 10 is started, the air in the Mason jar 21 is sucked into the first vacuum chamber 1021 from the above gap by the vacuum pump 302. Then, the air enters the vacuum pump 302 from the first suction hole 1023 and the three-way valve 307, and then is discharged.

Figure 6:
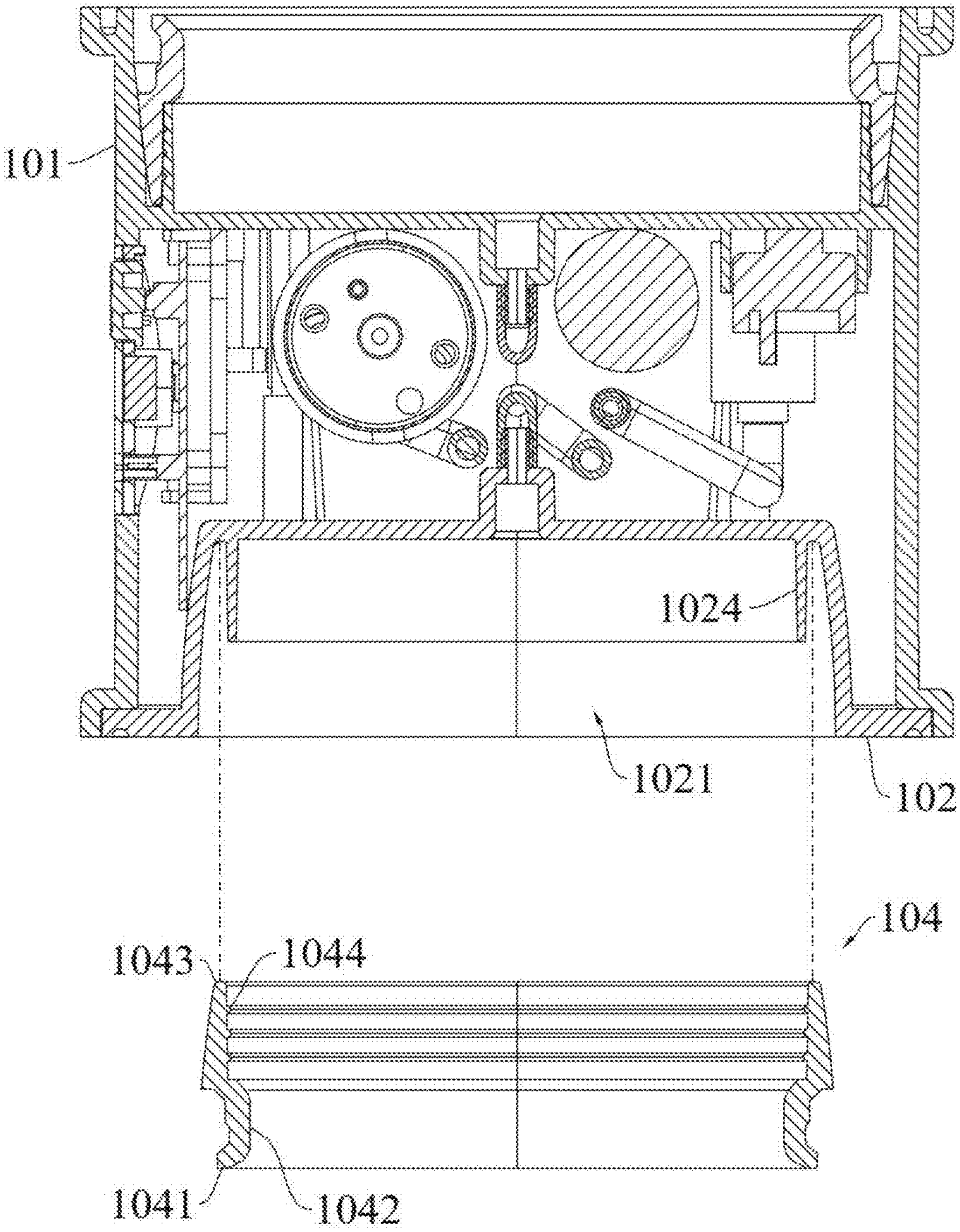
FIG. 6 is a cross-sectional view of a vacuum machine according to some embodiments of the present disclosure.

In some embodiments, as illustrated in FIG. 6, the first sealing ring 104 is detachably connected to the first chamber base 1022, and one of the purposes of the detachable connection is that the material of the first chamber base 1022 does not need to be elastic as the first sealing ring 104 does. Therefore, the first chamber base 1022 and the first sealing ring 104 may be made of different materials and may be processed independently. The detachable connection is one of the connection modes between the two. In addition, due to wear and aging of the material, the performance of the first sealing ring 104 for sealing the bottle mouth 211 gradually decreases. The detachable structure may make the replacement of the first sealing ring 104 easier and more economical. Third, the radius of the inlet 1042 of the first sealing ring 104 of different sizes may be adapted to the bottle mouth 211 of different specifications, so that the vacuum machine 10 may be adapted to Mason jars 21 of different sizes.

According to one of the detachable structures, as illustrated in FIG. 6, the first sealing ring 104 has a first connection end 1041 facing the bottle mouth 211 and a second connection end 1043 facing the first chamber base 1022. An inner wall of the first connection end 1041 is defined with an annular inlet 1042 protruding inward, and the annular inlet 1042 may tightly wrap around an outer side of the bottle mouth 211. The first chamber base 1022 is provided with an annular interface 1024 extending toward the first sealing ring 104. The second connection end 1043 of the first sealing ring 104 is sleeved on an outer side of the annular interface 1024. The inner wall of the second connection end 1043 of the first sealing ring 104 is provided with a sealing rib 1044. The sealing rib 1044 tightly abuts against the outer wall of the annular interface 1024, thereby establishing a sealed connection between the first sealing ring 104 and the first chamber base 1022.

As illustrated in FIG. 3, in order to facilitate assembly and later maintenance, in some embodiments, the first end face 102 of the body 101 is provided with a detachable cover 106, and the first vacuum chamber 1021 is provided on the cover 106. The body 101 is provided with an open compartment, and the air extraction assembly 30 is placed in the compartment. The cover 106 is installed at the opening of the compartment and encapsulates the air extraction assembly 30 in the compartment.

Figure 13:
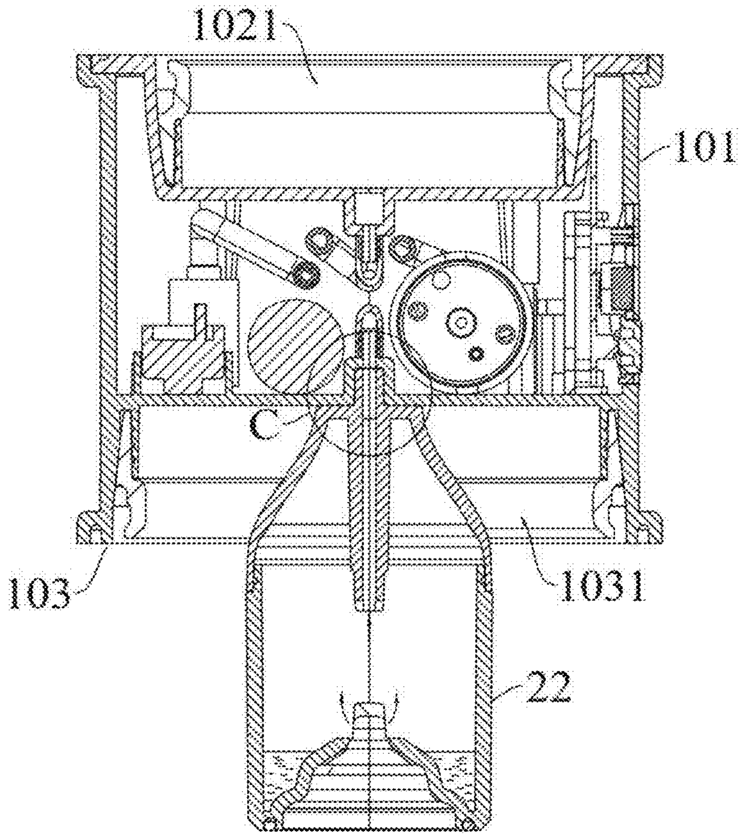
FIG. 13 is a structural perspective view of the vacuum machine according to some embodiments of the present disclosure combined with the adapter.
Figure 14:
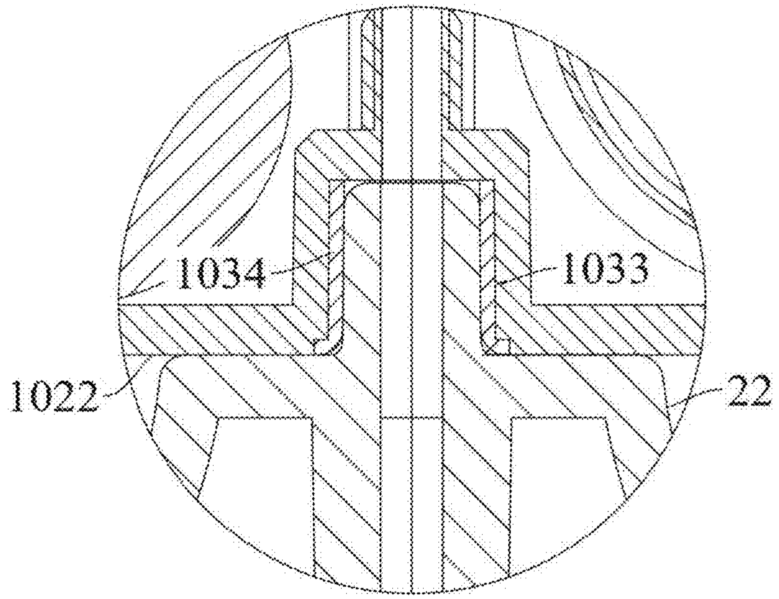
FIG. 14 is a partial enlarged perspective view of area C in FIG. 13.

As illustrated in FIG. 13, the vacuum machine 10 of the present disclosure may also be applied to a vacuum storage bag through an adapter 22. A first end of the adapter 22 may be selectively inserted into the second suction hole 1033, and a second end of the adapter 22 is connected to a suction port of the vacuum storage bag. Then, the vacuum machine 10 is started to evacuate the vacuum storage bag. Apertures of the first suction hole 1023 and the second suction hole 1033 may be the same or different, and there is no limitation here. In some embodiments, the apertures of the first suction hole 1023 and the second suction hole 1033 are different, allowing for installation of different adapters 22. In some embodiments, each of the inner walls of the first air intake hole 1023 and the second air intake hole 1033 is provided with a sealing rubber ring 1034 to improve the sealing performance.

The above are only some embodiments of the present disclosure, and does not limit the patent scope of the present disclosure. All equivalent structural changes made by using the contents of the present disclosure specification and drawings under the inventive concept of the present disclosure, or directly/indirectly applied in other related technical fields are included in the protection scope of the present disclosure.

What is claimed is:

1. A multi-purpose vacuum machine, comprising:

a body comprising at least two end faces, each of the at least two end faces defining a vacuum chamber; the vacuum chamber comprising a chamber base and a sealing ring, and the chamber base defining at least one air suction hole;

an air extraction assembly comprising a vacuum pump and a multi-way valve, the multi-way valve comprising a first port and at least one second port, a number of the at least one second port is equal to a number of the at least one air suction hole, and the first port being selectively in communication with one of the at least one second port to form different connection states; the first port being in communication with the vacuum pump, and each of the at least one second port being in communication with a corresponding one of the at least one air suction hole;

a direction sensing switch configured to obtain a directional change of the body; and a main control board; the vacuum pump, the multi-way valve and the direction sensing switch being electrically connected to the main control board, and the main control board configured to control the connection state of the multi-way valve based on a direction obtained by the direction sensing switch;

wherein the vacuum chamber is configured to accommodate a bottle mouth of a container and seal the bottle mouth, and the at least two of the vacuum chambers comprises at least two different accommodation sizes to adapt to bottle mouths of different sizes.

2. The vacuum machine according to claim 1, wherein the at least two of the end faces comprises a first end face and a second end face, the first end face and the second end face are arranged in opposite directions of the body, and the multi-way valve comprises a three-way valve.

3. The vacuum machine according to claim 1, wherein the main control board is electrically connected to a control switch, and the control switch is configured to control a working state of the vacuum pump.

4. The vacuum machine according to claim 1, wherein the air extraction assembly further comprises a vacuum sensing switch and a first communication piece; the vacuum pump, the first port of the multi-way valve and the vacuum sensing switch are in communication with the first communication piece via the first communication piece; and the vacuum sensing switch is electrically connected to the main control board.

5. The vacuum machine according to claim 1, wherein the air extraction assembly further comprises a one-way air valve and a second communication piece; the vacuum pump, the first port of the multi-way valve and the one-way air valve are in communication with the second communication piece and are interconnected by the second communication piece; the one-way air valve is electrically connected to the main control board.

6. The vacuum machine according to claim 1, wherein the vacuum machine comprises a panel, the panel is provided with a switch key, the switch key is electrically connected to the main control board, and the main control board is configured to control a working state of the vacuum machine by means of the switch key.

7. The vacuum machine according to claim 6, wherein the panel is provided with at least one indicator light, and the least one indicator light is electrically connected to the main control board.

8. The vacuum machine according to claim 6, wherein the panel is provided with a power interface, and the power interface is electrically connected to the main control board.

9. The vacuum machine according to claim 1, wherein the vacuum machine comprises a battery, and the battery is electrically connected to the main control board.

10. The vacuum machine according to claim 1, wherein the sealing ring is detachably connected to the chamber base.

11. The vacuum machine according to claim 10, wherein the sealing ring has a first connection end facing the bottle mouth and a second connection end facing the chamber base, an inner wall of the first connection end is defined with an annular inlet protruding inward, and the annular inlet is configured to tightly wrap around an outer side of the bottle mouth;

the chamber base is provided with an annular interface extending toward the sealing ring, and the second connection end of the sealing ring is sleeved on an outer side of the annular interface.

12. The vacuum machine according to claim 1, wherein a sealing rubber ring is provided in the at least one suction hole, the at least one suction hole is configured to selectively receive the adapter, and the rubber ring is sealed and connected to an insertion end of the adapter.

* * * * *